(12) United States Patent
Stoffels et al.

(10) Patent No.: US 10,279,817 B2
(45) Date of Patent: May 7, 2019

(54) METHOD FOR PROVIDING A PRESSURE POINT FOR A HAPTIC GAS PEDAL OF A HYBRID VEHICLE

(71) Applicant: FORD GLOBAL TECHNOLOGIES, LLC, Dearborn, MI (US)

(72) Inventors: Harald Stoffels, Cologne (DE); Moritz Klaus Springer, Hagen (DE); Christian Hofmann, Cologne (DE); Joachim Hansen, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 15/343,465

(22) Filed: Nov. 4, 2016

(65) Prior Publication Data

US 2017/0129502 A1 May 11, 2017

(30) Foreign Application Priority Data

Nov. 5, 2015 (DE) .......................... 10 2015 221 752

(51) Int. Cl.
| | | |
|---|---|---|
| G05G 5/03 | (2008.04) | |
| B60W 50/16 | (2012.01) | |
| B60W 20/19 | (2016.01) | |
| B60W 10/06 | (2006.01) | |
| B60W 10/08 | (2006.01) | |

(Continued)

(52) U.S. Cl.
CPC ............ *B60W 50/16* (2013.01); *B60W 10/06* (2013.01); *B60W 10/08* (2013.01); *B60W 20/10* (2013.01); *B60W 20/19* (2016.01); *B60W 50/10* (2013.01); *B60W 2510/244* (2013.01); *B60W 2540/103* (2013.01); *Y02T 10/48* (2013.01); *Y02T 10/6286* (2013.01); *Y10S 903/905* (2013.01)

(58) Field of Classification Search
None
See application file for complete search history.

(56) References Cited

U.S. PATENT DOCUMENTS

| | | | | |
|---|---|---|---|---|
| 2010/0066562 | A1* | 3/2010 | Stahlin | G08G 1/162 340/902 |
| 2011/0010653 | A1* | 1/2011 | Wallaert | G05D 23/1902 715/771 |

(Continued)

FOREIGN PATENT DOCUMENTS

| | | |
|---|---|---|
| DE | 102008000577 A1 | 9/2009 |
| DE | 102012005965 A1 | 9/2013 |

OTHER PUBLICATIONS

German Examination Report for German Application No. 10 2015 221 752.3 dated Aug. 17, 2016.

*Primary Examiner* — Adam D Tissot
(74) *Attorney, Agent, or Firm* — David Kelley; Brooks Kushman P.C.

(57) ABSTRACT

A system and method for controlling a hybrid vehicle having an electric operating mode selectively modify a pressure point for an accelerator pedal in response to current vehicle and/or ambient operating conditions to reduce unintentional starting of an internal combustion engine and maintain electric mode operation while the accelerator pedal position is less than the pressure point. The vehicle operating conditions or mode may indicate a parking maneuver, stop-and-go traffic, or an eco mode where electric operation may be desired.

14 Claims, 2 Drawing Sheets

(51) Int. Cl.
 *B60W 50/10* (2012.01)
 *B60W 20/10* (2016.01)

(56) References Cited

U.S. PATENT DOCUMENTS

| | | | | |
|---|---|---|---|---|
| 2011/0106353 A1* | 5/2011 | Brocke | ................... | B60K 6/48 |
| | | | | 701/22 |
| 2012/0078467 A1* | 3/2012 | Schweikl | ............. | B60K 26/021 |
| | | | | 701/36 |
| 2014/0244111 A1* | 8/2014 | Gross | ................... | B60W 50/14 |
| | | | | 701/36 |

* cited by examiner

METHOD FOR PROVIDING A PRESSURE POINT FOR A HAPTIC GAS PEDAL OF A HYBRID VEHICLE

CROSS-REFERENCE TO RELATED APPLICATIONS

This application claims foreign priority benefits under 35 U.S.C. § 119(a)-(d) to DE 10 2015 221 752.3 filed Nov. 5, 2015, which is hereby incorporated by reference in its entirety.

TECHNICAL FIELD

This disclosure relates to a method for providing a pressure point for a haptic gas pedal of a hybrid vehicle.

BACKGROUND

From the prior art, it is known to provide a pressure point which can be felt by the operator of the gas pedal when a certain position of a gas pedal of a motor vehicle is reached, which pressure point can be overcome by applying greater force, after which a certain action in the vehicle is triggered. Such a pressure point is implemented, for example, as a mechanical pressure point, e.g., as a kickdown switch for an automatic transmission. Such kickdown switches are usually mechanical components, which are located at the end of actuating travel for a gas pedal and, there, provide a corresponding shift point, which is noticeable as an increase in pressure at the foot of the operator.

Vehicles comprising different types of drive systems which propel the vehicle, either in combination or individually, utilize electric drive systems, for example, in interaction with internal combustion engines. Vehicles of this kind are hybrid electric vehicles (HEV) or mild hybrid electric vehicles (MHEV). Such vehicles can be moved, at least along some portions of the route, in the purely electric drive mode, in which an internal combustion engine is not involved and is switched off. Usually, depending on the gas pedal position implemented by the operator and/or the manner in which the operator actuates the gas pedal, a decision is reached by a control unit as to whether the internal combustion engine should be activated or not. When the vehicle driver operates the gas pedal, unintentional movements of the gas pedal can occur, which the vehicle electronics interpret, in an undesirable manner, as a special request for propulsion and therefore activate the internal combustion engine. This can happen even if an activation of the internal combustion engine were avoidable due to a sufficiently high state of charge of the on-board batteries and/or the traffic situation. An unintentional activation of the internal combustion engine results in undesirable additional fuel consumption, handling which is perceived as poor and irregular, and unnecessary exhaust gas emissions. In certain application cases which are also often still susceptible to a misinterpretation of gas pedal movements implemented by the operator, e.g., when the vehicle is being parked, an unintentional activation of the internal combustion engine can result in undesired additional torque delivery to the wheels.

SUMMARY

One of the problems addressed by one or more embodiments according to the present disclosure is therefore that of providing a pressure point for a haptic gas pedal of a hybrid vehicle, which avoids an unintentional activation of the internal combustion engine in certain operating states or in certain application cases.

A further problem is that of providing the operator of the vehicle with unambiguous and distinctly noticeable haptic feedback at the point at which an activation of the internal combustion engine is imminent. These problems are solved by a system or method for providing a pressure point for a haptic gas pedal having the features of one or more embodiments described herein.

In this case, initially at least one application case is defined, in which an exclusively electric drive of the vehicle is desirable. These application cases are stored, for example, in a memory of the vehicle electronics. In a next step, it is determined, on the basis of the current operating situation of the vehicle, whether such a predefined application case exists. In the next step, a check is carried out to determine whether a state of charge of an electric current source of the vehicle for the purely electric drive of the present application case is sufficiently great. If so, in a next step, a pressure point is set at a gas or accelerator pedal, the operating force characteristic map of which is influenced, specifically at a certain point in the gas pedal travel having an operating force which is higher there as compared to the usual gas pedal force. The vehicle is subsequently operated with an exclusively electric drive if a pedal travel s is less than the point s3 of the pressure point or until the state of charge of the electric current source requires an activation of the internal combustion engine, in particular even though the pedal travel is less than the point s3.

The invention therefore makes it possible to provide the driver with unambiguous feedback of a mechanical type at the gas pedal, wherein, up to the point at which said feedback becomes noticeable, said driver can be certain that the vehicle is operated only electrically unless the state of charge of the electric current source of the vehicle demands an activation of the internal combustion engine. Only when the driver intentionally presses on the gas pedal, overcoming the pressure point, despite the existence of a relevant application case, is the internal combustion engine activated due to a detection of an acceleration demand by the driver, which is definitely intentional.

By way of the method according to one or more embodiments, unintentional starting processes of the internal combustion engine and, therefore, unintentional fuel consumption and exhaust gas production are successfully avoided.

In one particular embodiment, the vehicle is operated including activation of the internal combustion engine or exclusively by the internal combustion engine when the state of charge is probably insufficient for the particular application case.

In a further embodiment, the pressure point is set for a predetermined time period Δt. After expiration of the time period Δt, in particular, it is determined again whether the predefined application case still exists. If so, the pressure point is set again, for example, for the predetermined time period Δt. If not, the pressure point is dispensed with.

In one particular embodiment, a pressure point progression of an operating force F for the gas pedal as a function of a pedal travel s or a pedal angle α is determined for a certain pressure point in the vicinity of the pressure point. In this case, in particular, the objective is to achieve a progression which is haptically distinctly noticeable, but which, to the greatest extent possible, does not proceed abruptly.

In one particular embodiment, parameters are established for the at least one application case, wherein the parameters can be one or more of the parameters listed in the following.

For example, a slope of the graph of the pedal force F as a function of the pedal travel s or the pedal angle α, in particular as a function of the pressure point progression, can be determined. Alternative or cumulatively, a distance between a start point and an end point of the pressure point progression and a force difference between the start point and the end point of the pressure point progression or a force difference between the operating force on the gas pedal at the pressure point and the operating force at the end of the pressure point progression can be determined.

In another embodiment, which can be carried out alternatively or cumulatively, the force progression of the graph varies from the region between the start point of the pressure curve and the pressure point and/or between the pressure point and the end point of the pressure curve.

Finally, a gradient and/or a curve characteristic from the end point of the pressure point progression up to the end stop of the gas pedal can be determined, in particular "after" the pressure point.

In other words, a pressure point can be established at any point s of the pedal travel or at any pedal point α, and a pressure point progression can be selected immediately before the pressure point and a pressure point progression can be selected immediately after the pressure point, so that a defined progression of the gas pedal operating force F as a function of the gas pedal travel or the gas pedal angle α takes place in a vicinity around the pressure point.

After the pressure point has been exceeded, i.e., after the gas pedal has been depressed past the pressure point, an internal combustion engine is advantageously activated. Possible application cases i of the preferred utilization of the method according to the invention are, for example:
  a) The vehicle is located in a slow speed zone, for example, on a residential street. Whether or not the vehicle is located in a slow speed zone, for example, on a residential street, can be determined, for example, via detection of a traffic sign by means of a traffic sign sensor. In the application case mentioned, for example, it can be useful to utilize the method when speed limits are up to 30 km/h or 50 km/h.
  b) There is a traffic jam or slow-moving traffic, which can be determined using a GPS and/or navigation system in combination with traffic information stored therein. Likewise, a proximity control system of the vehicle, with which it is possible to maintain a constant distance from the preceding vehicle, can deduce that a traffic jam or slow-moving traffic exists, in particular when information provided by the GPS indicates that the vehicle is located on a country road or an expressway or even on a superhighway and the traffic flow is stopped or is slow-moving.
  c) A park assist system has been activated. In this case, unintentional gas pedal movements may take place and activating the internal combustion engine during implementation of parking maneuvers, for example, in tight surroundings, adversely affects the uniformity of the handling of the vehicle.
  d) In a basic setting of the vehicle, for example, when the vehicle is in the energy-saving mode ("eco" button or "eco" setting of the automatic transmission), it can be advantageous to assume that a purely electric drive of the vehicle is desirable whenever possible.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter based on the disclosed representative embodiments.

Figure 1:
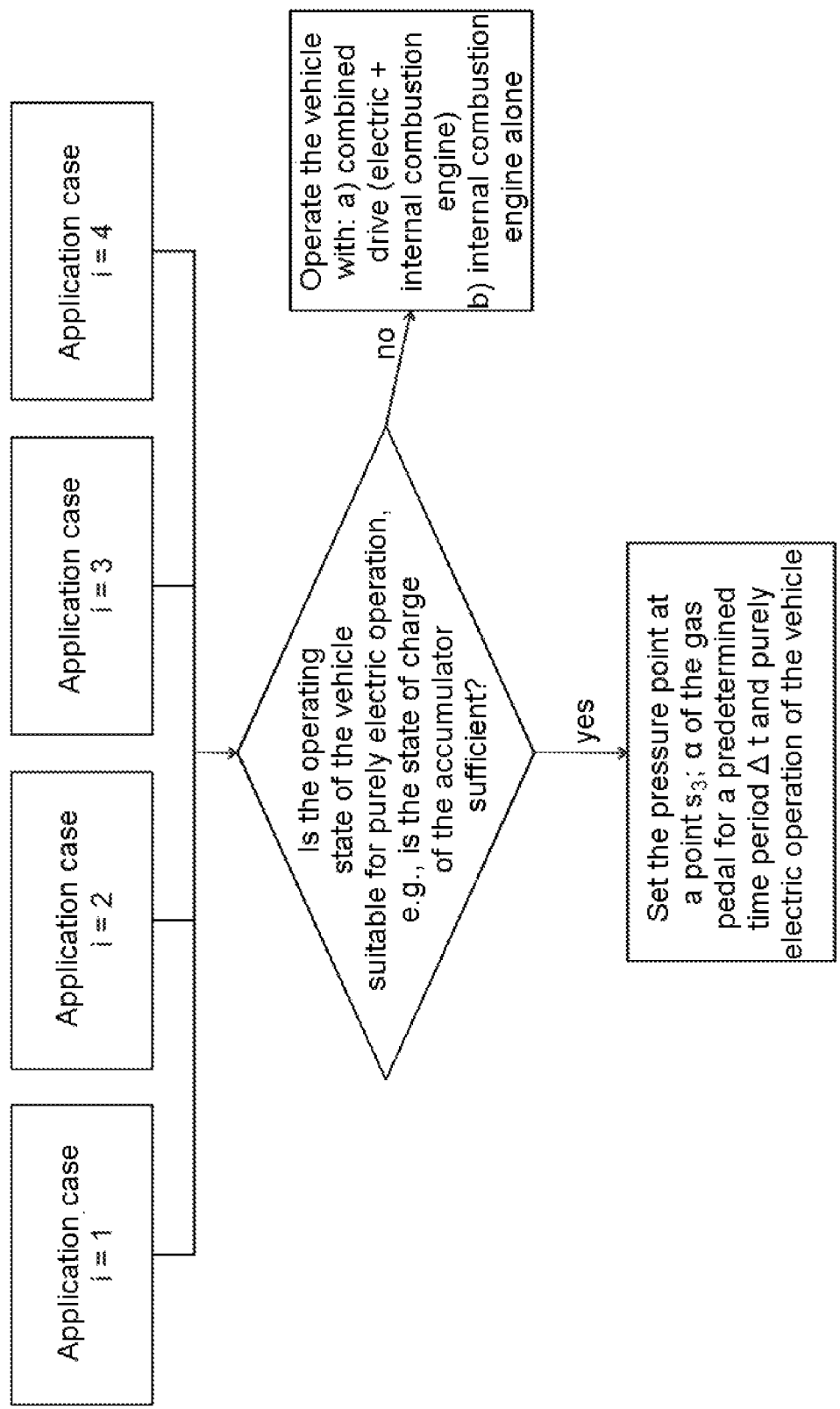
FIG. 1 schematically shows a flow chart illustrating operation of a system or method for modifying accelerator force progression according to various embodiments.

FIG. 1 shows one possible flow chart for utilizing a system or method according to embodiments of the disclosure.

First, a plurality of application cases i, e.g., four application cases i=1 through i=4 are predefined with respect to their criteria. These application cases i represent driving profiles, which make it appear desirable to implement these driving profiles preferably in the purely electric operation of a hybrid vehicle or a mild hybrid vehicle.

Such application cases can be, for example:
  1. The vehicle is located in a slow speed zone, for example, on a residential street or in a zone having speed limits up to 30 km/h or 50 km/h.
  2. A driving situation with slow-moving traffic or a traffic jam exists.
  3. The park assist system is activated, and so it can be assumed that a maneuver into a parking space or out of a parking space is taking place.
  4. The vehicle, with respect to its basic setting, is in an energy-saving mode, for example due to a corresponding selection of an energy-saving configuration carried out by the vehicle driver.

Further application cases are also conceivable, of course, which make it appear desirable to allow the resultant driving profiles to operate purely electrically.

If it is now determined that the vehicle is in an operating situation in which one of the predefined application cases exists, a check is subsequently carried out to determine whether the current operating state of the vehicle is suitable for implementing the driving profile belonging to the detected application case, in purely electric operation. Such a parameter for the operating state of the vehicle can be, for example, the state of charge of the energy storage device(s).

If the result of the check of the operating state of the vehicle is that the operating state of the vehicle is sufficient for a purely electric operation of the vehicle during the present application case, then, according to various embodiments, a pressure point is set at a point $s_3$ of the gas pedal travel of the gas pedal. This pressure point is characterized by an operating force $F_2^i$ which is elevated as compared to the progression of the gas pedal operating force without a pressure point. Such a pressure point $[s_3^i; F_2^i]$ is preferably set for a certain time period Δt. During this time period Δt, the vehicle is operated purely electrically, provided the vehicle operator does not intentionally overcome the pressure point by applying an operating force which is greater than the force $F_2^i$ at the pressure point $[s_3^i; F_2^i]$.

If the result of the check is that the operating state of the vehicle is insufficient for handling the application case purely electrically, setting the pressure point can be dispensed with and the vehicle can be operated by activating the internal combustion engine and implementing the driving profile in the purely internal combustion-driven mode. Alternatively, a combined operation of electric drive and internal combustion engine-drive can take place.

Figure 2:
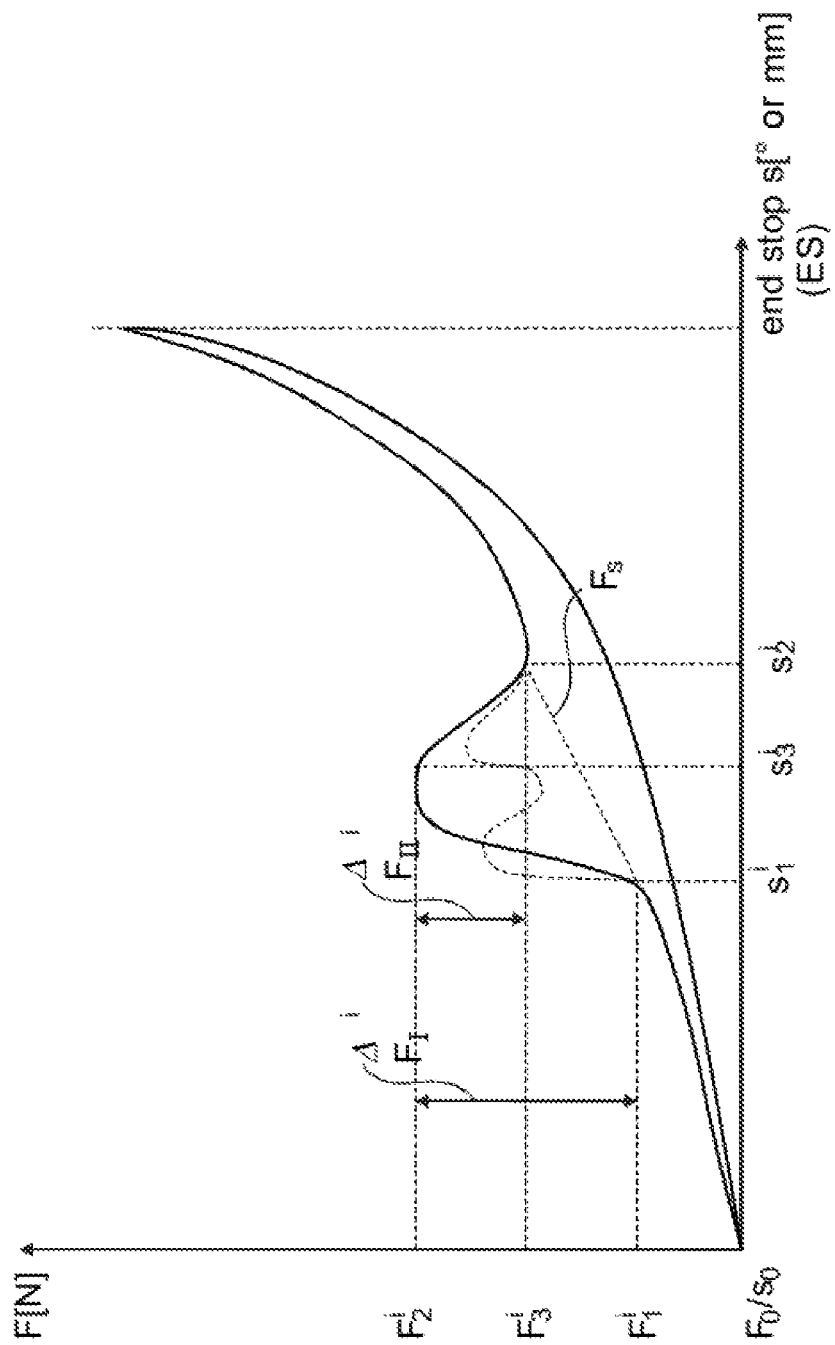
FIG. 2 shows, by way of example, a force progression of the operating force of the gas or accelerator pedal F as a function of the pedal travel s or the pedal angle α.

In FIG. 2, a progression of an operating force F as a function of a gas pedal travel s or a gas pedal angle α is shown by way of example. The operating force progression F(s; α) as a function of the gas pedal travel s or the gas pedal angle α is shown for the entire gas pedal travel s/α from an unactuated position $s=s_0$ of the gas pedal up to the point when the gas pedal is depressed down to an end stop ES. A force maximum is present at one point $s_3^i$. The operating force at the point $s_3^i$ is $F_2^i$. At this point, the driver of the vehicle perceives a pressure point $[s_3^i; F_2^i]$ at the gas pedal. A pressure point progression is illustrated in the vicinity of the pressure point $[s_3^i; F_2^i]$. This pressure point progression is represented by a solid line above a dotted line $F_s$. The dotted line $F_s$ shows a standard operating force progression $F_s$ as a function of the pedal travel s when a pressure point has not been predetermined. At a point $[s_1^i; F_1^i]$, which is considered to be the start point for the pressure point progression F(s; α), the operating force F increases above the standard operating force $F_s$.

At a point $s_2^i$ there is an end point $[s_2^i; F_3^i]$ of the pressure point progression F(s; α). Between the start point $[s_1^i; F_1^i]$ and the end point $[s_2^i; F_3^i]$ of the pressure point progression, there is an operating force which is elevated relative to the standardized operating force $F_s$, wherein an operating force maximum exists at the point $s_3^i$, which forms the pressure point $[s_3^i; F_2^i]$.

A distance $\Delta s_{12}^i$ between the start point $[s_1^i; F_1^i]$ and the end point $[s_2^i; F_3^i]$ of the pressure point progression F(s; α) can be freely determined within wide limits. Likewise, the increase, i.e., the gradient of the operating force F between the start point $[s_1^i; F_1^i]$ and the pressure point $[s_3^i; F_2^i]$, can be adjusted depending on the point $s_3^i$ at which the pressure point $[s_3^i; F_2^i]$ is intended to be located. In a range of the gas pedal operating force progression which is still flat, i.e., in a range close to the unactuated pedal position $F_0/s_0$, for example, even a lesser gradient can be perceived as a clear increase of the operating force F toward a pressure point $[s_3^i; F_2^i]$. The closer the operating point $[s_3^i; F_2^i]$ is intended to be to the end stop ES of the pedal, the steeper the operating force increase should be starting at the start point $[s_1^i; F_1^i]$ up to the pressure point $[s_3^i; F_2^i]$, so that the driver receives distinct haptic feedback that a pressure point $[s_3^i; F_2^i]$ should exist here.

Likewise, force differences $\Delta F_I^i$ and $\Delta F_{II}^i$ can be established within wide limits, wherein the force difference $\Delta F_1^i$ is a force difference between the pedal force at the pressure point $[s_3^i; F_2^i]$ and the start point $[s_1^i; F_1^i]$, and the force difference $\Delta F_{II}^i$ is a force difference between the force at the pressure point $[s_3^i; F_2^i]$ and at the end point $[s_2^i; F_3^i]$.

The extent to which these parameters are selected with respect to their magnitude and position depends essentially on the type of application case and on the subjective perception regarding the point at which a distinct pressure point $[s_3^i; F_2^i]$ should be noticed. Suitable forces can be determined using empirical test series. It can also be advantageous, if necessary, to provide force differences $\Delta F_I^i$ and/or $\Delta F_{II}^i$ which differ for different application cases. Therefore, for example, a very high force difference $\Delta F_I^i$ can result in a pressure point which is very difficult to overcome, and so the driver, with approximately 100% certainty, will not unintentionally overcome this pressure point and induce an unintentional activation of the internal combustion engine.

Such a high value of the force difference can be useful, for example, when the vehicle is being parked. It can also be useful, however, in another application case, for example, driving in a slow speed zone, to set the force difference $\Delta F_I^i$ to be slightly lower, so that the pressure point $[s_3^i; F_2^i]$ is indeed distinctly noticeable but is also more easily overcome. In this case, values which can be selected within relatively wide ranges can yield meaningful results.

By way of the present disclosure, given a suitable operating state of a vehicle and the presence of a certain application case i, i.e., a certain existing driving profile, an unintentional activation of the internal combustion engine and associated inconveniences or undesirable effects are successfully avoided or are at least greatly reduced.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly described or illustrated.

What is claimed is:

1. A method for operating a hybrid vehicle, comprising: operating the vehicle with an exclusively electric drive when accelerator pedal travel is less than a pressure point or until a battery state of charge requires starting an engine, the pressure point associated with increased force for further pedal travel and set in response to both the battery state of charge being above a threshold and operating conditions satisfying a predefined application case including the vehicle being located in a speed zone having a speed limit below a predetermined threshold as determined by a traffic sign sensor wherein the operating conditions comprise activation of a vehicle park assist system.

2. The method of claim 1 wherein the pressure point is set for a predetermined time period and then removed after the predetermined time period.

3. The method of claim 1 wherein the pressure point has an associated operating force progression as a function of accelerator pedal travel relative to the pressure point.

4. The method of claim 3 wherein the associated operating force progression begins at an initial pressure point and operating force increases to at least the pressure point.

5. The method of claim 1 wherein parameters associated with the pressure point are set in response to operating conditions satisfying the application case, wherein the parameters comprise a slope of accelerator pedal force as a function of accelerator pedal travel or accelerator pedal angle.

6. The method of claim 1 wherein parameters associated with the pressure point are set in response to the operating conditions satisfying the application case, wherein the parameters comprise an accelerator pedal position start point and end point of increased operating force progression surrounding the pressure point.

7. The method of claim 6 wherein parameters associated with the pressure point are set in response to the operating conditions satisfying the application case, wherein the parameters comprise a force difference between the start point and the end point of the increased operating force progression.

8. The method of claim 1 wherein the engine is started only after accelerator pedal position exceeds the pressure point.

9. The method of claim 1 wherein the operating conditions further comprise activation of an energy-saving mode switch.

10. A hybrid vehicle having a haptic accelerator pedal with a controllable force profile, comprising:
   a controller coupled to the haptic accelerator pedal and programmed to operate the vehicle in an electric mode when accelerator pedal position is less than a selectable pressure point associated with increased force for further accelerator pedal travel, the pressure point being varied in response to a traction battery state of charge and vehicle speed being below an associated threshold and wherein the pressure point is varied in response to activation of a vehicle parking assist feature.

11. The hybrid vehicle of claim 10 wherein the controller is programmed to set the pressure point for a predetermined time period and to remove the pressure point thereafter.

12. The hybrid vehicle of claim 10 wherein the pressure point is varied in response to activation of a vehicle economy mode switch.

13. A method for operating a hybrid vehicle, comprising:
   setting, by a controller, an accelerator pedal force profile having a pressure point associated with increased force for accelerator pedal position beyond the pressure point, wherein the pressure point is set responsive to activation of a vehicle parking assist mode; and
   operating the vehicle in an electric drive mode unless accelerator pedal position exceeds the pressure point or battery state of charge is below an associated threshold.

14. The method of claim 13 further comprising starting an engine in response to accelerator pedal position exceeding the pressure point.

\* \* \* \* \*